(12) United States Patent
Tokushima

(10) Patent No.: US 8,478,088 B2
(45) Date of Patent: Jul. 2, 2013

(54) OPTICAL SWITCH AND MANUFACTURING METHOD THEREOF

(75) Inventor: Masatoshi Tokushima, Tokyo (JP)

(73) Assignee: NEC Corporation, Tokyo (JP)

( * ) Notice: Subject to any disclaimer, the term of this patent is extended or adjusted under 35 U.S.C. 154(b) by 317 days.

(21) Appl. No.: 12/919,465

(22) PCT Filed: Jan. 26, 2009

(86) PCT No.: PCT/JP2009/051201
§ 371 (c)(1),
(2), (4) Date: Aug. 25, 2010

(87) PCT Pub. No.: WO2009/110262
PCT Pub. Date: Sep. 11, 2009

(65) Prior Publication Data
US 2011/0008000 A1    Jan. 13, 2011

(30) Foreign Application Priority Data

Mar. 7, 2008  (JP) .................... 2008-057932
Aug. 14, 2008 (JP) .................... 2008-208926

(51) Int. Cl.
*G02B 6/26* (2006.01)
(52) U.S. Cl.
USPC ............. 385/16; 385/21; 385/27; 385/129; 385/142; 356/477
(58) Field of Classification Search
USPC ................................. 385/16, 125
See application file for complete search history.

(56) References Cited

U.S. PATENT DOCUMENTS

| 6,542,682 B2 * | 4/2003 | Cotteverte et al. ............. 385/125 |
| 6,775,430 B2 * | 8/2004 | Flory et al. ...................... 385/16 |
| 6,917,431 B2 * | 7/2005 | Soljacic et al. ................ 356/477 |
| 7,263,251 B2 * | 8/2007 | Shirane et al. ................... 385/16 |
| 7,307,732 B2 * | 12/2007 | Beausoleil ................... 356/477 |
| 7,421,179 B1 * | 9/2008 | Jiang et al. ................... 385/129 |

FOREIGN PATENT DOCUMENTS

| JP | 2003161971 A | | 6/2003 |
| JP | 2005250398 A | * | 9/2005 |
| JP | 2006126518 A | | 5/2006 |
| WO | 2005085921 A | | 9/2005 |

OTHER PUBLICATIONS

International Search Report for PCT/JP2009/051201 mailed Mar. 3, 2009.
T. Fujisawa et al., "Finite-Element Modeling of Nonlinear Mach-Zehnder Interferometers Based on Photonic-Crystal Waveguides for All-Optical Signal Processing", Journal of Lightwave Technology, vol. 24, No. 1, Jan. 2006, pp. 617-623.
M. Soljacic et al., "Photonic-crystal slow-light enhancement of nonlinear phase sensitivity", Journal of the Optical Society of America B, vol. 19, No. 9, Sep. 2002, pp. 2052-2059.

* cited by examiner

*Primary Examiner* — Hemang Sanghavi

(57) ABSTRACT

The object is to provide an optical switch capable of efficient operation and a manufacturing method thereof. The optical switch according to the present invention is a Mach-Zehnder interferometer type optical switch composed of a line defect waveguide of a photonic crystal. Further, the optical switch according to the present invention includes two directional couplers 20 and 23, and two paths of waveguides 30 and 32 therebetween. Furthermore, between the two paths, group velocity of guided light differs in the first path waveguide 20 and the second path waveguide 32.

26 Claims, 9 Drawing Sheets

OPTICAL SWITCH AND MANUFACTURING METHOD THEREOF

This application is the National Phase of PCT/JP2009/051201, filed Jan. 26, 2009, which is based upon and claims the benefit of priority from Japanese patent application No. 2008-57932, filed on Mar. 7, 2008, and Japanese patent application No. 2008-208926, filed on Aug. 14, 2008.

TECHNICAL FIELD

The present invention relates to an optical switch and a manufacturing method thereof, and particularly to an optical switch using a waveguide and a manufacturing method thereof.

BACKGROUND ART

A technique for realizing an optical integrated circuit on which optical parts are integrated is desired like a transistor integrated circuit on which electronic parts are integrated. At the moment, an optical circuit is formed by connecting optical parts such as an optical switch, a wavelength filter, and a 3 dB coupler (optical coupler), via an optical waveguide, for example, an optical fiber. However, if multiple optical parts can be integrated on a small chip, volume, power consumption, and manufacturing cost of the optical circuit is dramatically reduced.

There are many techniques developed aiming to realize the optical integrated circuit. One of the techniques is photonic crystal technique. In a broad sense, a photonic crystal body or a photonic crystal are general terms for a structure with periodically changing refractive index. In this document, unless otherwise noted, "photonic crystal body" and "photonic crystal" are used as synonymous words.

The photonic crystal has various special optical characteristics due to the periodic structure of refractive index distribution. The most representative feature is Photonic Band Gap (PBG). Although light can be transmitted through the photonic crystals, if the periodic refractive index change in the photonic crystal is large enough, light in a certain specific frequency band cannot propagate in the photonic crystal. The frequency band (or wavelength band) of the light which can be transmitted through the photonic crystals is referred to as a photonic band. On the other hand, the band in which the light cannot be transmitted is referred to as a Photonic Band Gap (PBG), indicating a gap existing between the photonic bands. Multiple PBG may exist in different frequency bands. The photonic band divided by PBG may be referred to as a first band, a second band, and a third band etc. in the ascending order of frequency.

If a minute defect which destroys the periodic structure of the refractive index distribution (periodicity of the refractive index distribution) exists in a photonic crystal, light in the frequency of PBG is confined in the minute defect. In that case, only the light in the frequency corresponding to the size of the defect is confined, thus the photonic crystal functions as an optical cavity. Therefore, such photonic crystal can be used as a frequency (wavelength) filter.

If minute defects are continuously located in lines in a photonic crystal, and a line defect is formed in the crystal, the light of the frequency inside PBG is confined in the line defect. Then, the light of the frequency of PBG propagates along the line defect. Therefore, such photonic crystal can be used as an optical waveguide. Such optical waveguide formed in the photonic crystal is referred to as a line defect waveguide.

If an optical filter and the optical waveguide are formed, either of them or a combination thereof can compose an optical functional element such as an optical modulator and an optical switch. Main optical function elements can be formed in the photonic crystal, and the optical functional elements are connected to compose an optical circuit. From these reasons, the photonic crystal is expected as a platform for optical integrated circuits.

At this point, in order to use the effect of PBG in the three directions of x, y, and z which are vertical to each other, it is required for the refractive index distribution of the photonic crystal to have three-dimensional periodic structure. However, the three-dimensional periodic structure is complicated, and thereby increasing the manufacturing cost. Thus, the photonic crystal (hereinafter may be referred to as a "two-dimensional photonic crystal") in which the refractive index distribution has two-dimensional periodic structure is often used. To be specific, the two-dimensional photonic crystal is used in which the refractive index distribution has periodicity on a substrate surface, but has a limited thickness with no periodicity in the thickness direction. In that case, light confinement in the thickness direction of the substrate is realized by total reflection caused by a refractive index difference and not the effect of PBG.

However, the characteristics of the two-dimensional photonic crystal with limited thickness do not completely match the characteristics of the two-dimensional photonic crystal with unlimited thickness. However, if the refractive index distribution in the thickness direction of the two-dimensional photonic crystal with limited thickness is reflectionally symmetric in the area where light propagates, they almost match the optical characteristics of the two-dimensional photonic crystal with unlimited thickness. Operation prediction of a device by the two-dimensional photonic crystal with unlimited thickness is much easier than operation prediction considering over the limited thickness. Then, if the two-dimensional photonic crystal having reflectional symmetric refractive index distributions can be used, design of the device using the photonic crystal can be made easy as well.

There are some specific structures realized so far as the two-dimensional photonic crystal with limited thickness. Among them, a pillar type tetragonal lattice photonic crystal has a characteristic that propagation speed of light in a line defect waveguide is slow in a wide band. That is, it is slow group velocity. Generally, if a waveguide with slow propagation speed is used, an optical circuit of the same function can be made by a shorter waveguide length. Therefore, the line defect waveguide using the pillar type tetragonal lattice photonic crystal is suitable for the optical integrated circuit.

FIG. 9 is a pattern diagram illustrating the configuration of a line defect waveguide of the pillar type tetragonal lattice photonic crystal with limited thickness. In the illustrated pillar type tetragonal lattice photonic crystal, cylinders 52*a* and 52*b* are disposed in a tetragonal lattice pattern in a low dielectric constant material 51. The cylinders 52*a* and 52*b* are cylinders with limited height made of high dielectric constant material. Further, the cylinder 52*b* has a smaller diameter than the cylinder 52*a*. Since the state in which these cylinders 52*a* and 52*b* are disposed in the tetragonal lattice pattern resembles the state in which atoms are disposed in a lattice pattern in crystals such as silicon and quartz and it is for an optical use, it is referred to as a "photonic crystal". Therefore, the material of the low dielectric constant material 51 and the cylinders 52*a* and 52*b* are not necessarily crystal, and may be amorphous.

In the case of the photonic crystal illustrated in FIG. 9, the cylinder 52*a* is a complete photonic crystal cylinder, whereas the cylinder 52b has a smaller diameter than the cylinder 52a. Thus, the cylinder 52b is considered as a defect introduced in a perfect crystal. In the following explanation, in order to distinguish the perfect crystal cylinder 52a from the cylinder 52b which is equivalent to a defect, the former may be referred to as a "non-line defect pillar" and the latter may be referred to as a "defect pillar", a "defect cylinder", or a "line defect pillar". However, it should be noted that the line defect pillar itself does not especially have a defect.

The photonic crystal line defect pillars 52b illustrated in FIG. 9 are arranged to form a line on a certain straight line. Accordingly, a line defect waveguide is formed by the line defect pillars 52b and the surrounding non-line defect pillars 52a. In the line defect waveguide of the cylinder type tetragonal lattice photonic crystal illustrated in FIG. 9, the line of the line defect pillars 52b is equivalent to a core in a waveguide of total reflection confinement type such as an optical fiber. Moreover, the lattice of the non-line defect pillars 52a on the both sides thereof and the surrounding low dielectric constant material 51 are equivalent to a clad. In the case of the total reflection confinement type waveguide, the total reflection confinement type waveguide functions as a waveguide only by the existence of the core and the clad. Similarly, in the case of the line defect waveguide, line defect waveguide functions as a waveguide only by the existence of the line defect pillar 52b, the surrounding non-line defect pillar 52a, and the low dielectric constant material 51.

The optical devices and the optical circuits using the pillar type tetragonal lattice photonic crystal are expected to be miniaturized and higher integrated. However, there have been no structure heretofore that effectively takes advantage of the usage of photonic crystals for a 2×2 optical switch focused in the present invention.

Now, there is an optical switch using a Mach-Zehnder interferometer by a waveguide as one of the relevant 2×2 optical switches. FIG. 10 is a pattern diagram illustrating the configuration thereof. The configuration and an operation of an optical switch 72 of FIG. 10 are as follows.

The optical switch 72 of FIG. 10 is composed of a 3 dB directional coupler 60, a 3 dB directional coupler 61, and a waveguide 62 and a waveguide 63 therebetween. Light entered from either one of an input port 70 and an input port 73 propagates through a waveguide 71 or a waveguide 74, and is incident on the 3 dB directional coupler 60. The 3 dB directional coupler 60 divides this incident optical power by half. The divided light respectively propagates through the waveguide 62 and the waveguide 63, and enters two waveguide 64 and waveguide 65 which compose the 3 dB directional coupler 61. Then, light is emitted from emission ports 66 and 67 via waveguides 68 and 69.

The ratio of the optical power emitted to the emission port 66 and the emission port 67 of the 3 dB directional coupler 61 changes by the relationship in phases between the light entered in the waveguide 64 and waveguide 65. Specifically, the ratio of the optical power emitted to the emission port 66 and the emission port 67 changes depending on which of the waveguides 64 and 65 has progressed or delayed how much phase between the light entered the waveguide 64 and the waveguide 65. By using this phenomenon, the exit of light can be switched between the emission port 66 and the emission port 67 by adjusting the phase difference of light while the light propagates through the waveguide 62 and the waveguide 63.

The adjustment of the phase difference while the light propagates through the waveguide 62 and the waveguide 63 is performed by changing an effective refractive index of only one waveguide, for example, the waveguide 63. The change of the effective refractive index is performed by changing the refractive index of the material of the waveguide using heat or an electric field.

The amount of change in the phase of the light propagating through the waveguide increases in proportion to the length of the waveguide. For this reason, the length of both of the waveguides, which are the waveguide 62 and the waveguide 63, is increased while keeping the length to be the same or only the length of the wavelength 63 is increased with the effective refractive index that is to be changed. This enables an easy operation of the optical switch by a small refractive index change of the waveguide material.

Note that the case in which the waveguide 62 and the waveguide 63 have the same length is referred to as a symmetrical Mach-Zehnder type 2×2 optical switch, and the case in which the waveguide 62 and the waveguide 63 have different length may be referred to as an asymmetrical Mach-Zehnder type 2×2 optical switch.

[Patent Document 1]
Domestic Re-publication of PCT International Publication for Patent Application, No. 2005-085921

DISCLOSURE OF INVENTION

Technical Problem

As mentioned above, in the case of the 2×2 optical switch using the usual waveguide illustrated in FIG. 10, in order to facilitate the operation of the 2×2 optical switch even by a small refractive index change of the wavelength material, it is necessary to increase the length of the wavelength. In that way, power of a control signal such as electricity and light for changing the refractive index of the wavelength must be increased. Therefore, efficient operation cannot be performed for the power of the control signal. Furthermore, increased total length of the optical switch often causes the operation speed of the switch to decrease in connection therewith.

Moreover, the patent document 1 discloses a photonic crystal coupled defect waveguide which uses a line defect of a photonic crystal as a waveguide. Additionally, a point is disclosed in which the size of a photonic crystal element is partially changed outside the waveguide. This changes the refractive index of each mode propagating inside the coupled waveguide and shortens the coupling length.

However, the patent document 1 does not mention at all about the point that the waveguide is composed of line defect pillars and the change in size of the line defect pillar. For this reason, even when using the technique of patent document 1 to the 2×2 switch, efficient operation cannot be perfumed for the power of the control signal.

The present invention is made in view of the abovementioned situation, and aims to provide an optical switch capable of efficient operation for the power of the control signal, and a manufacturing method thereof.

Technical Solution

An optical switch according to the present invention is an optical switch of a Mach-Zehnder interferometer type composed of a line defect waveguide of a photonic crystal that includes two directional couplers and two paths of waveguides therebetween, in which between the two paths, a first path of the waveguide and a second path of the waveguide have different group velocity of guided light.

Further, an optical switch according to the present invention is an optical switch of a Mach-Zehnder interferometer type composed of a line defect waveguide of a pillar type photonic crystal that includes two directional couplers and two paths of waveguides therebetween, in which between the two paths, a cross-section area of a defect pillar forming a line defect of at least one path of the waveguide is smaller than a cross-section area of a defect pillar forming a line defect of the waveguide composing the directional coupler.

Furthermore, an optical switch according to the present invention is an optical switch of a Mach-Zehnder interferometer type composed of a line defect waveguide of a photonic crystal that includes two directional couplers and two paths of waveguides therebetween, in which a part or all of at least one of the two paths of the waveguides operates as a resonator that resonates to light of a frequency other than a waveguide band of the waveguide composing the directional coupler.

On the other hand, a manufacturing method according to the present invention is a manufacturing method of an optical switch of a Mach-Zehnder interferometer type composed of a line defect waveguide of a photonic crystal that includes forming two directional couplers and two paths of waveguides therebetween, in which between the two paths, a first path of the waveguide and a second path of the waveguide have different group velocity of guided light.

Advantageous Effects

According to the present invention, it is possible to provide an optical switch capable of efficient operation, and a manufacturing method thereof.

EXPLANATION OF REFERENCE 1 2×2 OPTICAL SWITCH, 10 FIRST INPUT PORT, 11 SECOND INPUT PORT,
12 FIRST OUTPUT PORT, 13 SECOND OUTPUT PORT, 14 LINE DEFECT PILLAR,
20 FIRST DIRECTIONAL COUPLER, 21 LINE DEFECT PILLAR, 22 LINE DEFECT PILLAR,
23 SECOND DIRECTIONAL COUPLER, 24 LINE DEFECT PILLAR, 25 LINE DEFECT PILLAR,
30 WAVEGUIDE FOR FIRST PATH, 31 LINE DEFECT PILLAR, 32 WAVEGUIDE FOR SECOND PATH,
33 FIRST TAPER WAVEGUIDE, 34 LINE DEFECT PILLAR, 35 SECOND TAPER WAVEGUIDE,
36 LINE DEFECT PILLAR, 37 CONNECTION WAVEGUIDE, 38 LINE DEFECT PILLAR, 40 NON-LINE DEFECT PILLAR,
51 LOW DIELECTRIC CONSTANT MATERIAL, 52$b$ LINE DEFECT PILLAR, 52$a$ NON-LINE DEFECT PILLAR,
60 3 dB DIRECTIONAL COUPLER, 61 3 dB DIRECTIONAL COUPLER, 62 WAVEGUIDE, 63 WAVEGUIDE,
64 WAVEGUIDE, 65 WAVEGUIDE, 66 EMISSION PORT, 67 EMISSION PORT, 68 WAVEGUIDE,
69 WAVEGUIDE, 70 INPUT PORT, 71 WAVEGUIDE, 72 OPTICAL SWITCH
73 INPUT PORT, 74 WAVEGUIDE, 80 HEATER
90 WAVEGUIDE FOR FIRST PATH, 91 WAVEGUIDE FOR SECOND PATH, 100 TAPER WAVEGUIDE,
101 LINE DEFECT PILLAR, 101 TAPER WAVEGUIDE, 103 LINE DEFECT PILLAR
104 TAPER WAVEGUIDE, 105 LINE DEFECT PILLAR, 106 TAPER WAVEGUIDE
107 LINE DEFECT PILLAR, 110 CONNECTION WAVEGUIDE, 111 LINE DEFECT PILLAR,
112 CONNECTION WAVEGUIDE, 113 LINE DEFECT PILLAR, 120 PROXIMATE WAVEGUIDE,
121 LINE DEFECT PILLAR, 122, PROXIMATE WAVEGUIDE, 123 LINE DEFECT PILLAR

BEST MODE FOR CARRYING OUT THE INVENTION

First Embodiment

First, an optical switch according to a first embodiment of the present invention is described.

Figure 1:
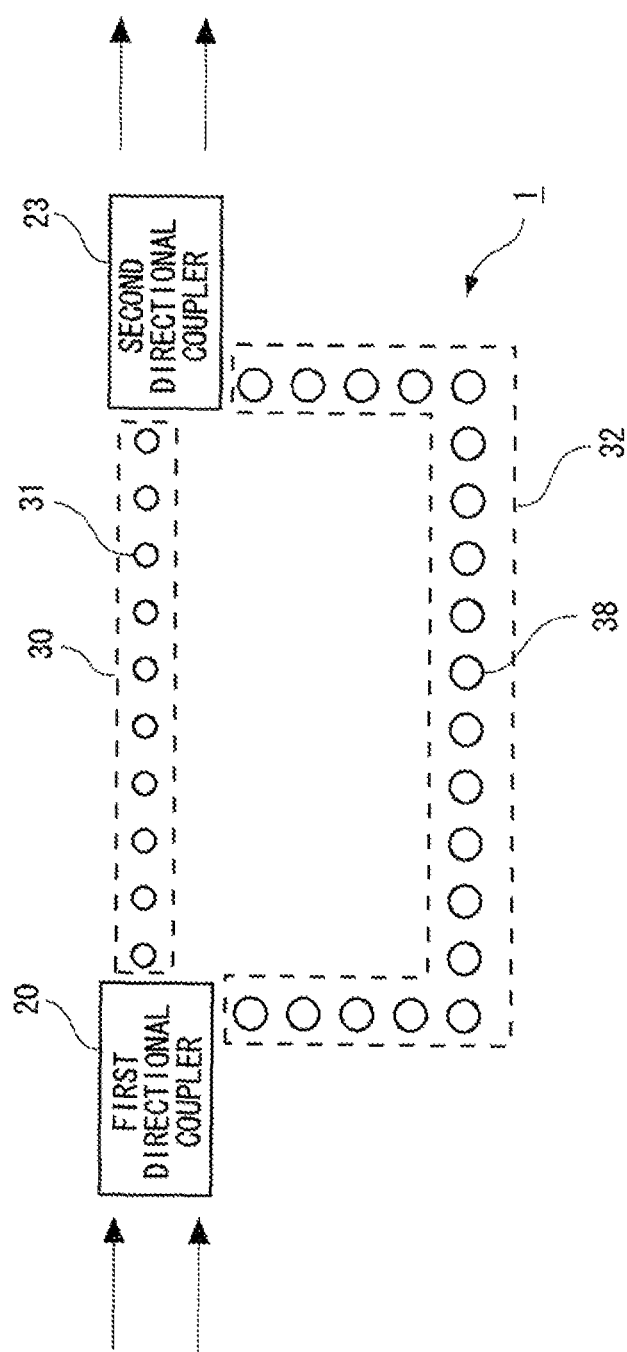
FIG. 1 is a schematic cross-sectional diagram illustrating a configuration of a 2×2 optical switch according to a first embodiment.

The optical switch according to this embodiment is, for example, a m×n optical switch (m and n are integers of two or more) using a Mach-Zehnder type interferometer which has m number of input ports and n number of output ports. Note that the Mach-Zehnder type interferometer shall include an asymmetrical Mach-Zehnder type interferometer and a symmetrical Mach-Zehnder type interferometer. First, with reference to FIG. 1, a 2×2 optical switch is explained as an example of the optical switch according to this embodiment. To be specific, the 2×2 optical switch by the Mach-Zehnder type interferometer which has two input ports and two output ports is explained. FIG. 1 is a schematic cross-sectional diagram illustrating the configuration of a 2×2 optical switch 1. Note that FIG. 1 illustrates only the main parts for simplification.

The 2×2 optical switch 1 is included in a photonic crystal as a part. The 2×2 optical switch 1 includes a first directional coupler 20 on the input side, and a second directional coupler 23 on the output side. The directional couplers 20 and 23 can couple and/or split the optical power. The directional couplers 20 and 23 have two input ends and two output ends, for example. Then, the optical power entered from the two input ends is coupled, and the optical power is split into the two output ends. Two paths of waveguides are included between the directional couplers 20 and 23. Specifically, a first path waveguide 30 and a second path waveguide 32 are included between the directional couplers 20 and 23. For example, one output end of the first directional coupler 20 and one input end of the second directional coupler 23 are connected by the first path waveguide 30. The other output end of the first directional coupler 20 and the other input end of the second directional coupler 23 are connected by the second path waveguide 32.

These waveguides 30 and 32 are line defect waveguides in the photonic crystal. The defect here is a minute defect in the periodic structure included in the photonic crystal. Further, the line defect waveguide is a waveguide in which the minute defects are arranged in a line. Specifically, the pillars (not illustrated) of the same shape are disposed periodically in the photonic crystal. This pillar is a non-defect pillar. Then, the pillars having smaller cross-section areas than cross-section areas of the non-defect pillars are disposed in a part of the photonic crystal. These are the defect pillars, and the part equivalent to the core of the line defect waveguide is composed by arranging these defect pillars in a line. That is, the part equivalent to the core of the line defect waveguide is composed of the defect pillars that form the line defects (line defect pillars). The part equivalent to the clad of the line defect waveguide is a lattice of the non-defect pillars on the both sides of the line defect pillars. However, in this document, for the simplicity, it may be expressed as "the line defect waveguide is composed of the line defect pillars". Note that the non-defect pillar (non-line defect pillar) and the line defect pillar have different cross-section areas, however the distribution interval (lattice constant) is constant. That is, the central interval of adjacent pillars is constant.

Moreover, between the two paths, the first path waveguide 30 and the second path waveguide 32 have different group velocity of guided light. In this example, the difference in the group velocity of the guided light is made by differentiating the cross-section areas of the line defect pillars of the waveguide of each path, as an example. That is, the cross-section area of the line defect pillar of one waveguide is larger than the cross-section area of the line defect pillar of the other waveguide. In FIG. 1, the cross-section area of the line defect pillar 38 of the second path waveguide 32 illustrated on the lower side is larger than the cross-section area of the line defect pillar 31 of the first path waveguide 30 illustrated on the upper side. The 2×2 optical switch 1 according to this embodiment is composed as mentioned above.

Next, an operation principle of the 2×2 optical switch 1 according to this embodiment is explained. First, light enters the input port, and the first directional coupler 20 splits the light by a predetermined split ratio. For example, light is emitted from each of the output ends of the first directional coupler 20 at the split ratio of 1:1. One of the split light propagates through the first path waveguide 30. Then, the other split light propagates through the second path waveguide 32. The light propagated therethrough is incident on the two input ends of the second directional coupler 23. Then, the ratio of the optical power emitted from the output ends of the second directional coupler 23 changes according to a phase difference of the light propagating though the two waveguides 30 and 32. That is, by changing the phase difference of the light propagating through the two waveguides 30 and 32, the ratio of the optical power emitted from the two output ports can be changed. In other words, it is possible to switch the output port to emit the light between the two output ports.

The phase difference of the light changes by changing the refractive index of one waveguide by the power of the control signal such as electricity and light. In this example, the refractive index of the second path waveguide 32 is changed. To be specific, between the two waveguides 30 and 32, the refractive index of the waveguide which has the line defect pillar with a large cross-section area is changed. This changes the phase of the light propagating through the waveguide 32 of the second path, and thereby changing the phase difference of the light propagating through the two waveguides 30 and 32. Then it is possible to switch the output port to emit the light between the two output ports.

As described so far, in the 2×2 optical switch 1 according to this embodiment, the cross-section area of the defect pillar forming the line defect of one waveguide is larger than the cross-section area of the defect pillar forming the line defect of the other waveguide. Specifically, the cross-section area of the line defect pillar 38 of the second path waveguide 32 is larger than the cross-section area of the line defect pillar 31 of the first path waveguide 30. Therefore, the group velocity dispersion of the second path waveguide 32 increases, and a slight change in the reflective index causes a large change in the phase difference. In summary, the 2×2 optical switch 1 can operate efficiently for the power of the control signal.

Figure 2:
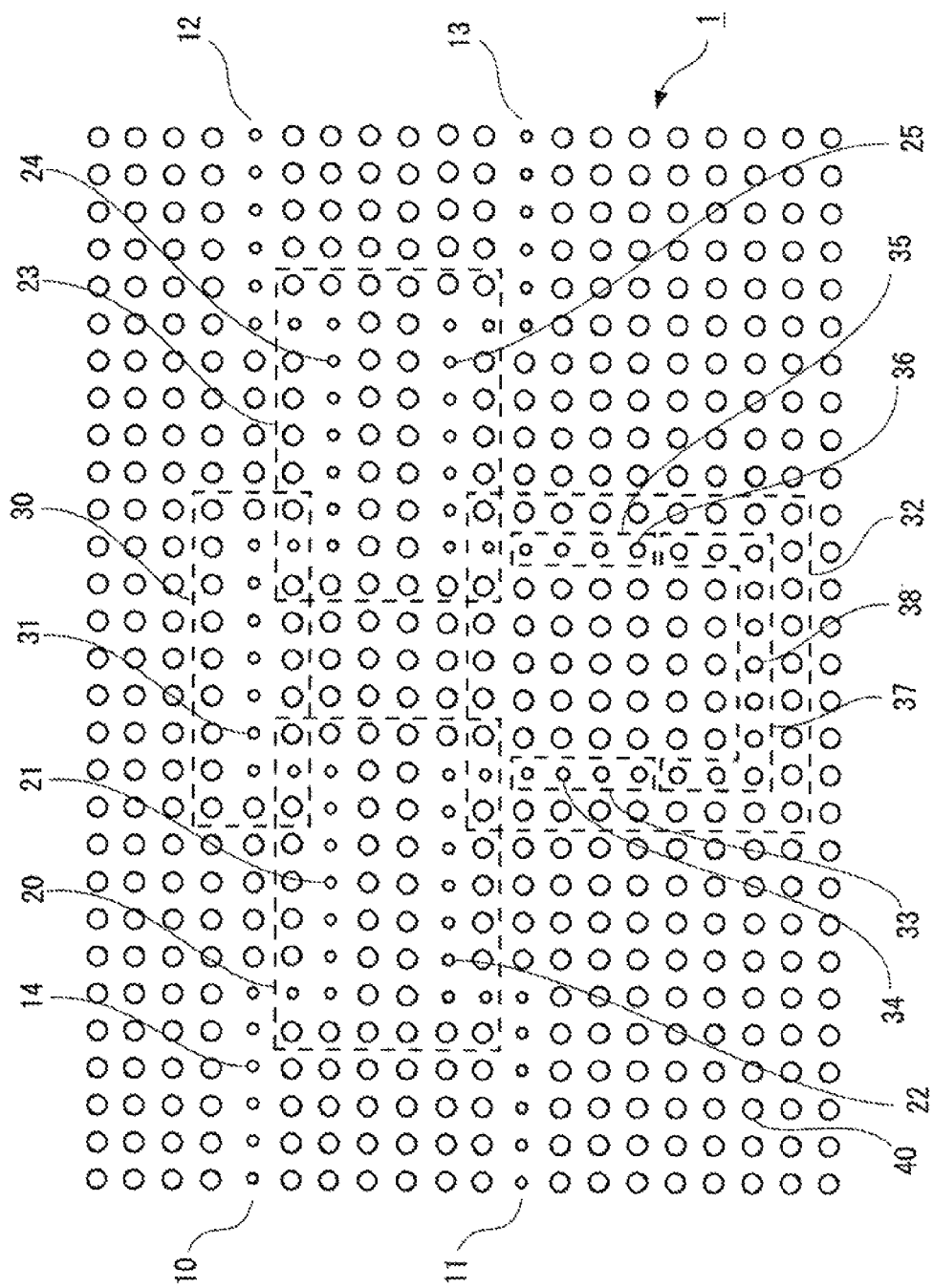
FIG. 2 is a schematic cross-sectional diagram illustrating a specific example of the configuration of the 2×2 optical switch according to the first embodiment.

Next, with reference to FIG. 2, a specific example of the configuration of the optical switch according to this embodiment is described. In this example, a 2×2 optical switch is explained as an example of the optical switch. FIG. 2 is a schematic cross-sectional diagram illustrating the specific example of the configuration of the 2×2 optical switch 1.

The 2×2 optical switch 1 of the present invention is, in many cases, included as a part of an arbitrary pillar type tetragonal lattice photonic crystal. A photonic crystal has dielectric pillars with high refractive index disposed in a periodical lattice pattern in the medium with relatively low refractive index. This dielectric pillar with high refractive index is a non-line defect pillar 40 or a line defect pillar. Various line defect waveguides (hereinafter referred to as a waveguide) is composed of the line defect pillars.

Referring to FIG. 2, the 2×2 optical switch 1 according to this embodiment includes the first directional coupler 20, the second directional coupler 23, the first path waveguide 30, and the second path waveguide 32. The first directional coupler 20 is disposed on the input side of the 2×2 optical switch 1. Two input ends of the first directional coupler 20 and two input ports 10 and 11 are connected by a waveguide. The second directional coupler 23 is disposed on the output side of the 2×2 optical switch 1. Two output ends of the second directional coupler 23 and two output ports 12 and 13 are connected by a waveguide.

The first directional coupler 20 has two waveguides in a photonic crystal. A part of these two waveguides are disposed proximate and in parallel to each other. Then, the optical power propagating through the two waveguides are coupled and split. Further, the second directional coupler 23 also has the same configuration. The two waveguides of the first directional coupler 20 are composed of line defect pillars 21 and line defect pillar 22 which are arranged in a line. The cross-section areas of the line defect pillars 21 and 22 composing the two waveguides are the same. The two waveguides of the second directional coupler 23 are composed of line defect pillars 24 and line defect pillars 25 which are arranged in a line. Further, the cross-section areas of the line defect pillars 24 and 25 composing the two waveguides are the same.

The first directional coupler 20 and the second directional coupler 23 are connected by the first path, and the second path which is different from the first path. The first path waveguide 30 is disposed in the first path, and the second path waveguide 32 is disposed in the second path. That is, waveguides 30 and 32 of the two paths are disposed between the first directional coupler 20 and the second directional coupler 23. In this example, one output end of the first directional coupler 20 and one input end of the second directional coupler 23 are connected by the first path waveguide 30. Moreover, the other output end of the first directional coupler 20 and the other input end of the second directional coupler 23 are connected by the second path waveguide 32.

The second path has longer waveguide length than the first path. Specifically, the second path waveguide 32 has longer waveguide length than the first path waveguide 30. In other words, the first path waveguide 30 and the second path waveguide 32 are asymmetrical. To be more specific, the 2×2 optical switch 1 according to this embodiment is a 2×2 optical switch by an asymmetrical Mach-Zehnder type interferometer. The cross-section areas of the line defect pillars 34, 36, and 38 of the second path waveguide 32 are larger than the cross-section area of the line defect pillar 31 of the first path waveguide 30. In other words, the diameters of the line defect pillars 34, 36, and 38 of the second path waveguide 32 are larger than the diameter of the line defect pillar 31 of the first path waveguide 30. As described so far, in the second path waveguide 32 with longer waveguide length, the cross-section areas of the line defect pillars 34, 36, and 38 are larger.

The second path waveguide 32 has taper waveguides 33 and 35 and a connection waveguide 37. One each of the taper waveguides 33 and 35 are disposed at both ends of the second path waveguide 32, and are composed of the line defect pillars 34 and 36. The connection waveguide 37 is disposed between the two taper waveguides 33 and 35, and is composed of the line defect pillars 38. The taper waveguides 33 and 35 are connected to the both ends of the connection waveguide 37. That is, the first directional coupler 20 and one end of the connection waveguide 37 are connected via the first taper waveguide 33. Then, the other end of the connection waveguide 37 and the second directional coupler 23 are connected via the second taper waveguide 35. The second path waveguide 32 is bent. Specifically, the connection waveguide 37 of the second path waveguide 32 is bent. That is, the connection waveguide 37 is formed to be U-shaped. Note that the taper waveguides 33 and 35 are formed to be a straight line.

The cross-section areas of the line defect pillars 34 and 36 of the taper waveguides 33 and 35 gradually increase or decrease from one end to the other end. Moreover, the cross-section area of the line defect pillar 38 of the connection waveguide 37 is substantially constant. In the first taper waveguide 33, the cross-section area of the line defect pillar 34 gradually increases from one end by the side of the first directional coupler 20 toward the other end by the side of the connection waveguide 37. In the second taper waveguide 35, the cross-section area of the line defect pillar 36 gradually decreases from one end by the side of the connection waveguide 37 toward the other end by the side of the second directional coupler 23. That is, the cross-section areas of the line defect pillar 34 of the first taper waveguide 33 and the line defect pillar 36 of the second taper waveguide 35 gradually decrease as moving away from the connection waveguide 37. In other words, the cross-section areas of the line defect pillar 34 of the first taper waveguide 33 and the line defect pillar 36 of the second taper waveguide 35 gradually increase from the directional couplers 20 and 23 toward the connection waveguide 37.

The cross-section area of the line defect pillar 34 of the first taper waveguide 33 is larger than the cross-section areas of the line defect pillars 21 and 22 of the first directional coupler 20, and smaller than the cross-section area of the line defect pillar 38 of the connection waveguide 37. Similarly, the cross-section area of the line defect pillar 36 of the second taper waveguide 35 is larger than the cross-section areas of the line defect pillars 24 and 25 of the second directional coupler 23, and smaller than the cross-section area of the line defect pillar 38 of the connection waveguide 37. Note that the line defect pillars of the waveguides other than the second path waveguide 32 have substantially constant cross-section areas. To be specific, the line defect pillars 14, 21, 22, 31, 24, and 25 have the substantially constant cross-section areas. The 2×2 optical switch 1 according to this embodiment is composed as mentioned above.

Next, an operation principle of the 2×2 optical switch 1 according to this embodiment is explained. First, light enters either of the two input ports 10 and 11. Then, the first directional coupler 20 splits the light by a predetermined split. For example, light is emitted from each of the output ends of the first directional coupler at the split ratio of 1:1. One of the split light propagates through the first path waveguide 30. Further, the other split light propagates through the second path waveguide 32. Specifically, the other split light propagates in the order of the first taper waveguide 33, the connection waveguide 37, and the second taper waveguide 35.

A phase difference is generated between the two propagated light. Each of the light in which the phase difference is generated therebetween is incident on the input ends of the second directional coupler 23. The phase difference changes the ratio of the optical power emitted from the output end of the second directional coupler 23. Specifically, while each light propagates, the exit of light can be switched between the output ports 12 and 13 by adjusting the phase difference in the light. Note that the power of the control signal, such as electricity and light, is used for the adjustment of the phase difference. The details of the adjustment of the phase difference are mentioned later.

In the 2×2 optical switch 1 of this embodiment, the second path waveguide 32 has large group velocity dispersion. This is because that the cross-section areas of the line defect pillars 34, 36, and 38 of the second path waveguide 32 are larger than the cross-section area of the line defect pillar 31 of the first path waveguide 30. The waveguide with large group velocity dispersion produces a large phase change even by a slight change in the refractive index. In the case of the waveguide 32 of the second path of this embodiment, there is an effect of producing a phase change of several to ten and several times or more of the rate of change of the refractive index. As a result, a 0.1% change in the refractive index of the second path waveguide 32 can also switch the exit of the light between the first output port 12 and the second output port 13.

That is, it requires only about 1/10 of the refractive index compared with the related 2×2 optical switch to switch the exist of the light. Therefore, it is possible to facilitate the operation of the 2×2 optical switch 1 without increasing the waveguide length of the 2×2 optical switch 1. Further, it is possible to suppress the power of the control signal such as electricity and light for changing the refractive index of the waveguide and light. In other words, an efficient operation can be possible for the power of the control signal. Therefore, it is possible to perform an operation with low power, and thereby realizing energy saving. Furthermore, the operation speed of the 2×2 optical switch 1 can be improved. Moreover, since it is not necessary to increase the waveguide length, the 2×2 optical switch 1 can be miniaturized. Additionally, it is possible to mount the 2×2 optical switch 1 in a photonic crystal optical integrated circuit, and thereby realizing a highly integrated optical switch circuit.

Since only the second path waveguide 32 has large group velocity dispersion, the light propagating through the other waveguide parts is barely influenced by the group velocity dispersion. Therefore, even when a high-speed optical signal is transmitted through the 2×2 optical switch 1 of the present invention, the optical signal is hardly distorted. Then, the performance of the 2×2 optical switch improves.

Further, as described above, the cross-section areas of the line defect pillars 21, 22, 24, and 25 of the directional couplers 20 and 23 are different from that of the line defect pillar 38 of the connection waveguide 37. For this reason, it is preferable to dispose the taper waveguides 33 and 35 having gradually changing cross-section areas between the directional couplers 20 and 23 and the connection waveguide 37. This enables an easy propagation of light from the first directional coupler 20 to the connection waveguide 37 and from the connection waveguide 37 to the second directional coupler 23.

Furthermore, for example, in a part of both ends of the second path, the cross-section area of the line defect pillar may be the same as the cross-section area of the line defect pillar 31 of the first path waveguide 30. In other words, waveguides other than the second path waveguide 32 with large cross-section areas of the line defect pillar may be disposed in a part of the second path. However, as in this exemplary embodiment, it is preferable to have larger cross-section areas of all the line defect pillars 34, 36, and 38 in the second path than the cross-section area of the line defect pillar 31 of the first path. That is, it is better to dispose only the second path waveguide 32 in the second path. Then, it is possible to shorten the waveguide length of the second path, and thereby enabling an efficient operation for the power of the control signal.

Moreover, the 2×2 optical switch may be a symmetrical Mach-Zehnder type interferometer, however it is preferable to have the 2×2 optical switch 1 by an asymmetrical Mach-Zehnder type interferometer as in this embodiment. That is, it is preferable to increase the waveguide length of only the path with the refractive index to be changed. This enables miniaturization of the 2×2 optical switch 1.

Next, the manufacturing process of the photonic crystal body of this embodiment is outlined. The photonic crystal body of this embodiment can be manufactured using an SOI wafer (Silicon On Insulator Wafer) as a substrate. The SOI wafer has the configuration in which a buried oxide film and a thin silicon active layer (SOI layer) are sequentially formed over a silicon substrate. In this example, as an SOI wafer, a buried oxide film with 2.0 μm thickness and a silicon active layer with 1.0 μm thickness are used. Further, the silicon active layer shall be non-doped.

First, the pattern illustrated in FIG. 2 is drawn using electron beam exposure technique. To be specific, a resist is applied on the SOI wafer first. Next, the pattern is exposed by an electron beam. Then the resist pattern is drawn outside the formation area of the non-line defect pillar and the line defect pillar of FIG. 2. Then, the silicon active layer is processed vertically according to the drawn resist pattern by anisotropy dry etching. Then, a plurality of circular holes are formed in the silicon active layer. After that, the remaining resist pattern is removed by acetone. Lastly, a ultraviolet curing resin with refractive index of 1.45, which is the same as the buried oxide film, is applied, and cured by ultraviolet radiation. Thus, the 2×2 optical switch 1 according to this embodiment is completed.

If the wavelength of the guided light is 1.55 μm for optical communications, the lattice constant shall be 0.4 μm, and the diameter of the non-line defect pillar 40 shall be 0.24 μm. The diameter of the line defect pillar shall be 0.16 μm in the waveguide part. The waveguide part here indicates the parts other than the stub waveguide part, which is the parts other than the second path waveguide 32 means. To be specific, the diameter of the line defect pillars 14, 21, 22, 24, 25, and 31 of the first path waveguide 30, and the directional coupler 20 and 23 or the like shall be 0.16 μm. Further, in the stub waveguide part, the diameter gradually increases to 0.22 μm in the direction away from the connection point with the waveguide part. That is, the diameters of the line defect pillars 34 and 36 of the taper waveguides 33 and 35 gradually increase or decrease in the range from 0.16 μm to 0.22 μm. Then, the diameter of the line defect pillar 38 of the connection waveguide 37 shall be 0.22 μm. The length of the waveguide stub, i.e., the length of the second path waveguide 32, shall be 15 μm.

Figure 3:
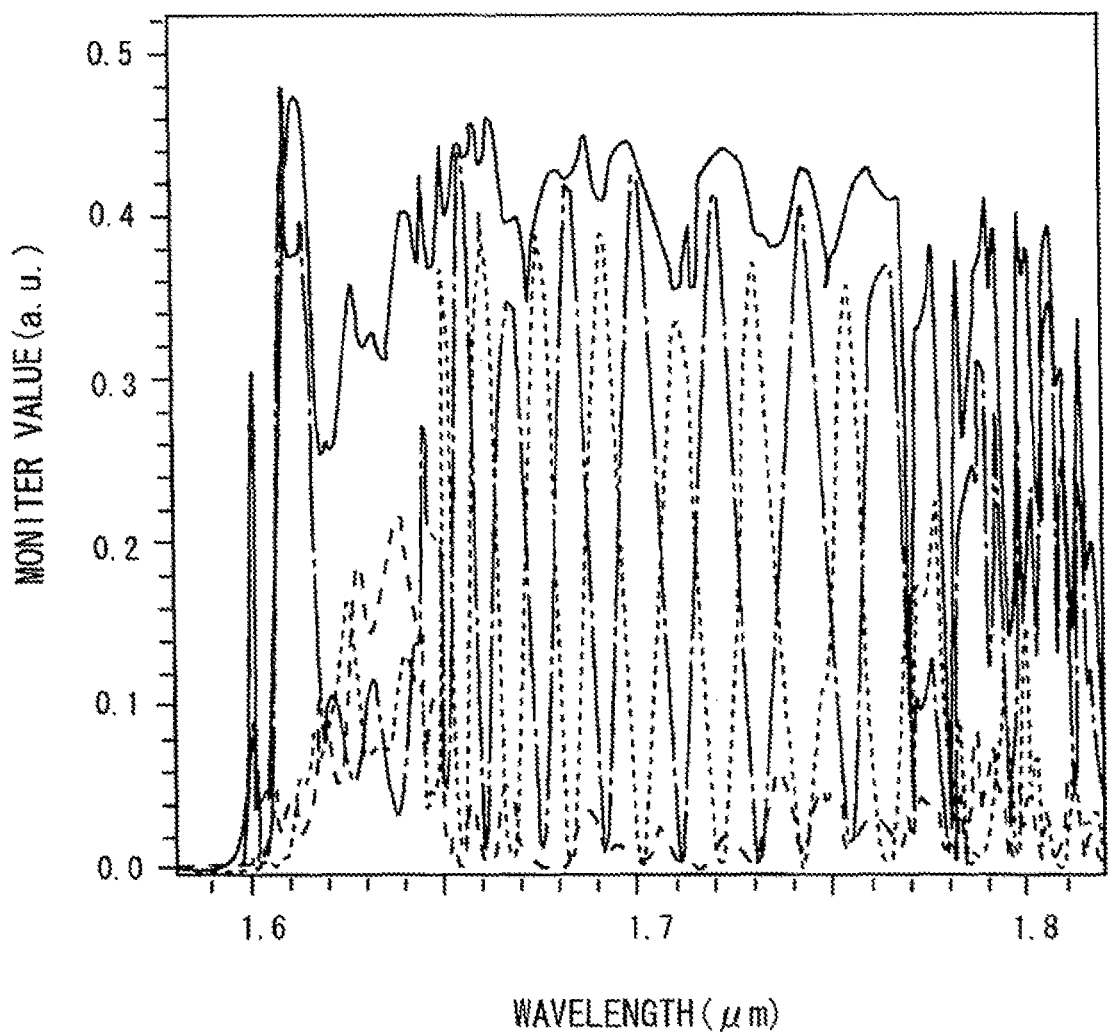
FIG. 3 illustrates a transmission spectrum of the configuration of the 2×2 optical switch illustrated in FIG. 2.

FIG. 3 illustrates a transmission spectrum of the 2×2 optical switch 1 according to this embodiment. In FIG. 3, the horizontal axis is wavelength (μm) and the vertical axis is light intensity (a.u.). For simplicity, FIG. 3 illustrates the calculation result when assuming that the silicon pillar with the above configuration is unlimited in the thickness direction.

In FIG. 3, the dashed line greatly oscillating according to the wavelength and the curve indicated by the fine dotted line indicates the output intensity of the light from two output ports 12 and 13. Note that the curve illustrated on the top in the wide wavelength range in FIG. 3 is the light intensity of the input light entered from one input port. Further, the curve indicated by the rough dotted line is the light intensity of the light which leaks from the other input port where the light does not enter. The output intensity of the light from the two output ports 12 and 13 alternately increases across a wide frequency range. That is, light is emitted alternately from the two output ports 12 and 13 across the wide frequency range.

If heat or an electric field is applied on the 2×2 optical switch 1, the refractive index of the waveguide will partially change. Specifically, the refractive index of the second path waveguide 32 changes. By the change in the refractive index, these curves shift to the long wavelength or short wavelength side simultaneously. That is, when compared by a specific wavelength, by the change in the refraction index and the shift of the curves, the output ports 12 and 13 with high output intensity are switched. In other words, the refractive index changes and the phase difference of the light propagating through the first path waveguide 30 and the second path waveguide 32 is adjusted. Then the output ports 12 and 13 with high output intensity are switched. In other words, the change in the refractive index enables the exit of light to switch between the output ports 12 and 13. Since there is oscillation of the output light intensity in the light wavelength range, the 2×2 optical switch 1 can be used in a wide wavelength range. Specifically, the operating frequency of the 2×2 optical switch 1 is not limited.

Figure 4:
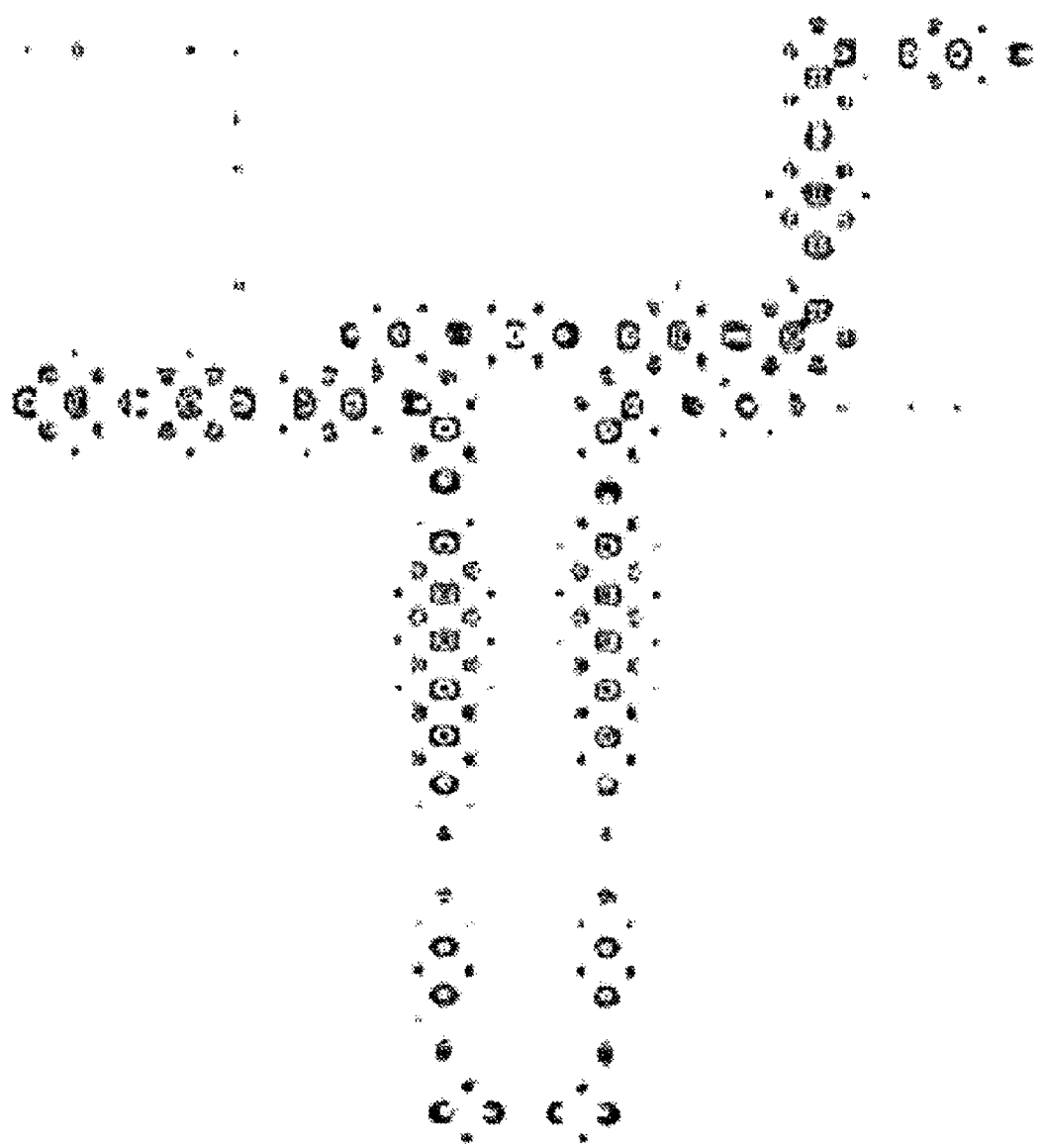
FIG. 4 illustrates an electromagnetism distribution of light when emitted from one output port of the 2×2 optical switch illustrated in FIG. 2.
Figure 5:
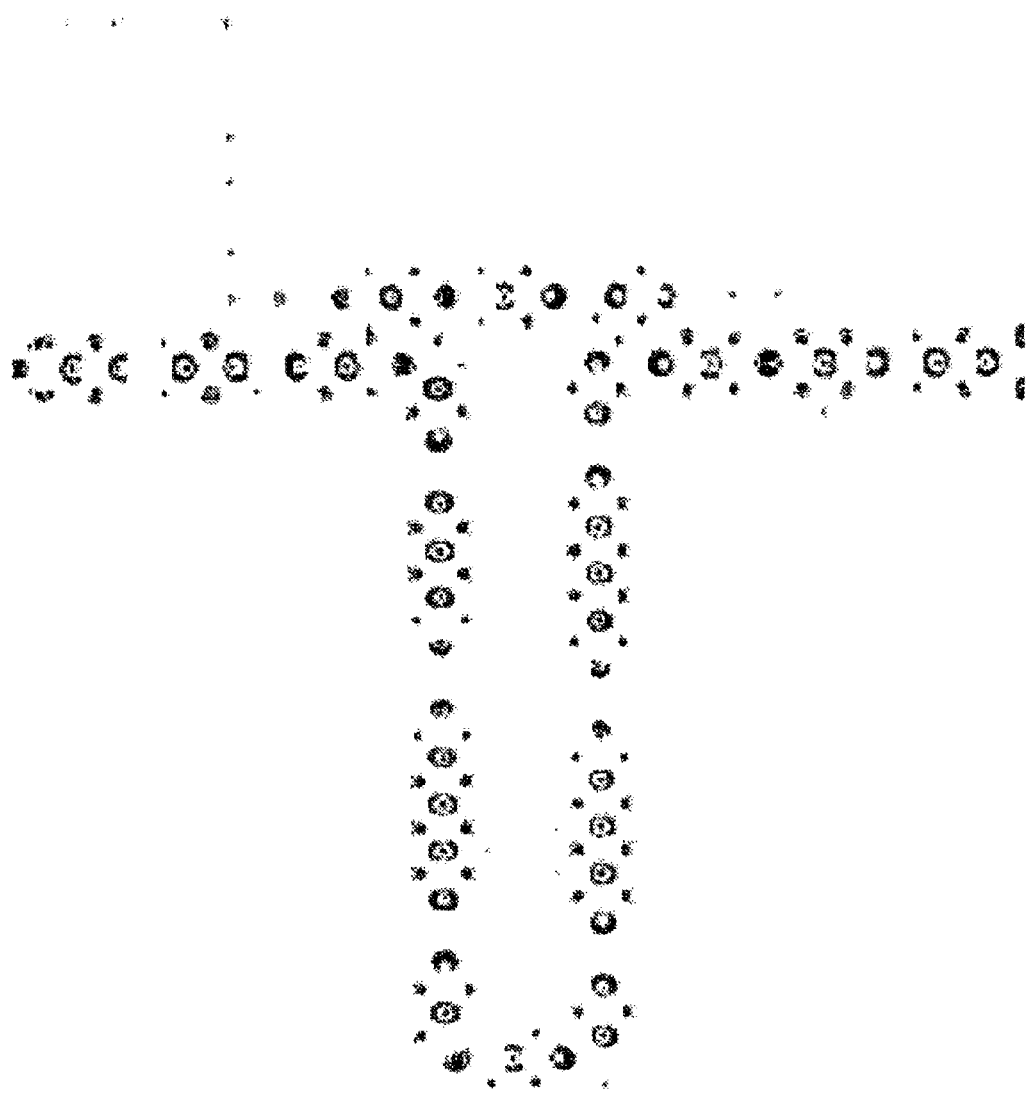
FIG. 5 illustrates an electromagnetism distribution of light when emitted from the other output port of the optical switch illustrated in FIG. 2.

FIGS. 4 and 5 each illustrate the calculation result of electric field distribution of the optical switch 1 when the light is emitted to the different output ports 12 and 13. In FIGS. 4 and 5, left side is the input ports 10 and 11, and right side is the output ports 12 and 13. In FIGS. 4 and 5, light enters from the lower side second input port 11. In FIG. 4, light is emitted from the upper side first output port 12, and light is hardly emitted from the lower side second output port 13. On the contrary, in FIG. 5, light is emitted from the lower side second output port 13, and light is hardly emitted from the upper side first output port 12. By changing the refractive index as above, the state of FIG. 4 and the state of FIG. 5 are switched. That is, the exit of light is switched between the output ports 12 and 13.

Figure 6:
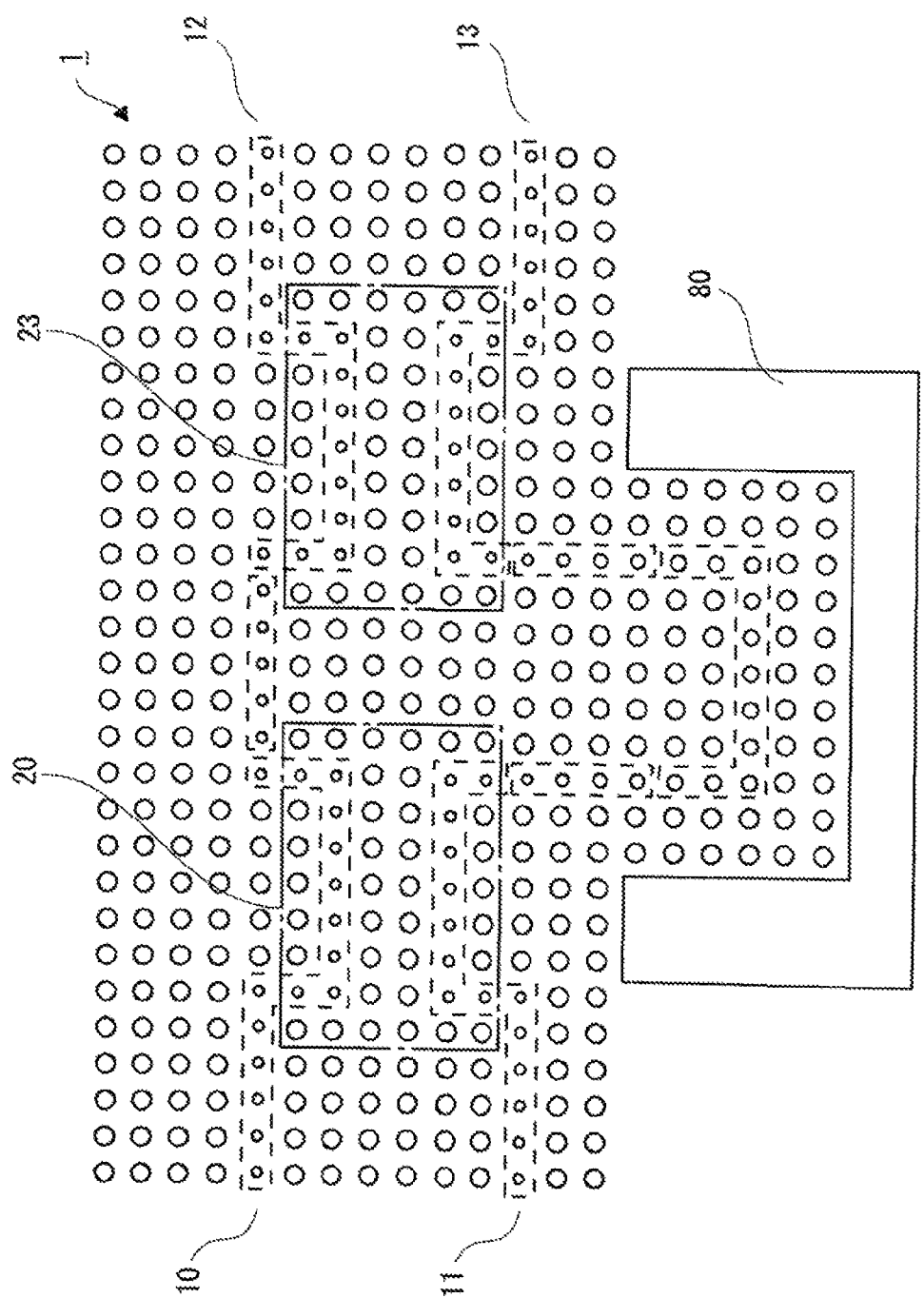
FIG. 6 is a schematic cross-sectional diagram illustrating a configuration of a 2×2 optical switch 1 including a refractive index tuner according to the first embodiment.

Next, another 2×2 optical switch 1 including a refractive index tuner is explained with reference to FIG. 6. The refractive index tuner is a tuner for producing a refractive index change in a waveguide. FIG. 6 is a schematic cross-sectional diagram illustrating the configuration of the 2×2 optical switch 1 including the refractive index tuner. Note that in FIG. 6, for easier understanding, the waveguide in which light propagates is indicated by the dashed line. The directional couplers 20 and 23 are indicated by the chain line.

The 2×2 optical switch 1 illustrated in FIG. 6 is mounted with a thermoregulator as a refractive index tuner. Specifically, the 2×2 optical switch 1 is mounted with a heater 80 as a thermoregulator. The heater 80 is mounted to the second path waveguide 32, especially proximate to the connection waveguide 37. Note that the other configuration is the same as the configuration illustrated in FIG. 2. Heating the heater 80 changes the refractive index of the waveguide stub, i.e., the waveguide 32 of the second path. In particular, the refractive index of the connection waveguide 37 changes. Then, the transmission spectrum of the photonic crystal body illustrated in FIG. 3 shifts to the long wavelength or the short wavelength side. As a result, in a specific wavelength, the transmittance of light (output intensity) changes and the exit of light is switched between the output ports 12 and 13. Then, it operates as the 2×2 optical switch 1. Thus the above effects can be produced.

Note that although the thermoregulator (the heater 80, to be specific) is used in order to change the refractive index, it is not limited to this. In the case that the refractive index tuner is a field intensity adjustor or a current adjuster, the same operation is performed.

Second Embodiment

Next, an optical switch according to a second embodiment of the present invention is explained.
The first embodiment provides the optical switch that can efficiently switch the output ports of light even if the waveguides of the two paths between the directional couplers are short. This embodiment to be described hereinafter provides the configuration which is especially efficient when changing the refractive index of the path between the directional couplers by an input of control light. In this embodiment, at least one of the waveguides of the two paths between the directional couplers includes a resonator, and the refractive index of the selected path is tuned by light resonated with the resonator.

Figure 7:
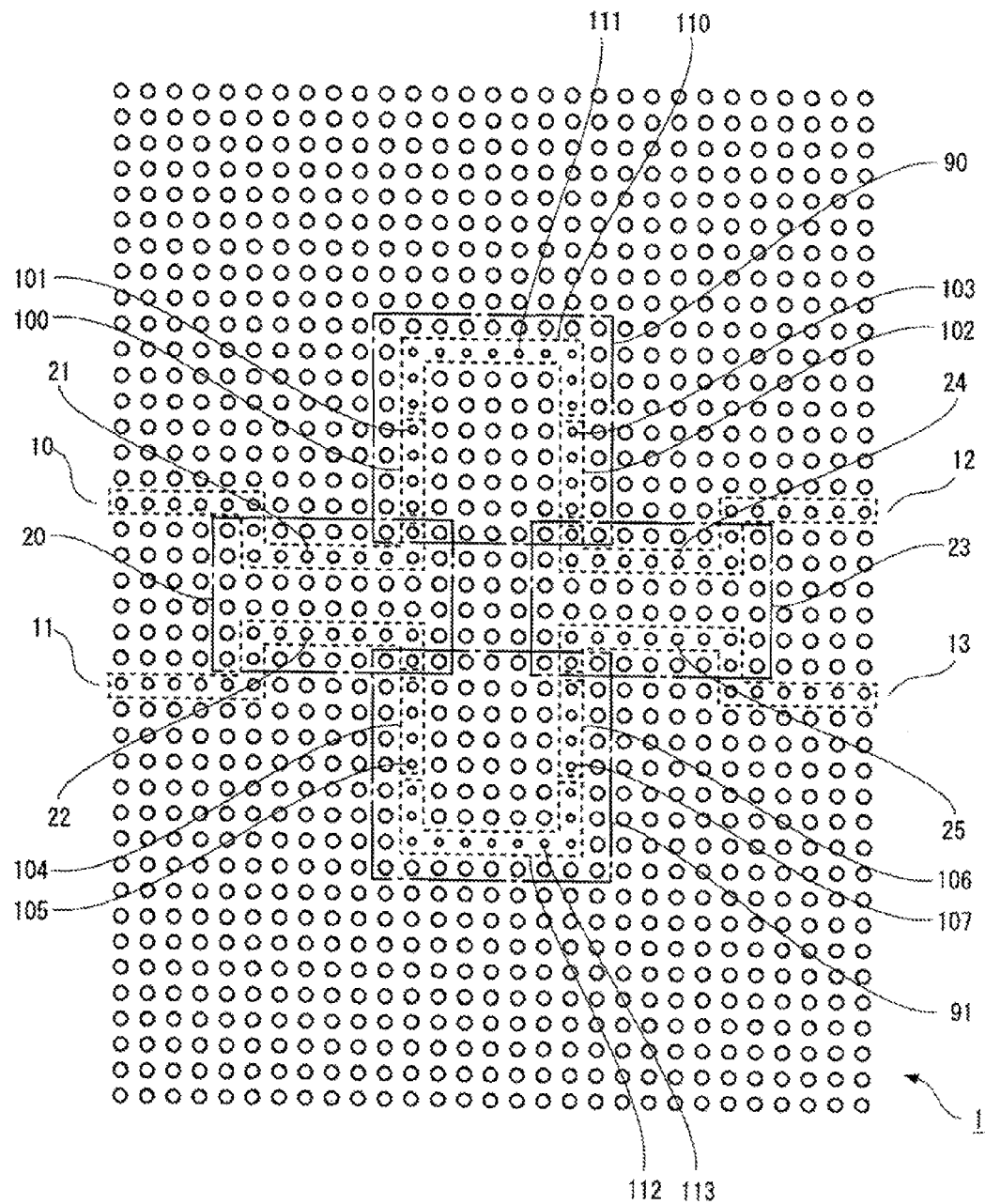
FIG. 7 is a schematic cross-sectional diagram illustrating a configuration of a 2×2 optical switch according to a second embodiment.

The optical switch according this embodiment is explained with reference to FIG. 7. In this example, a 2×2 optical switch is explained as an example of the optical switch. FIG. 7 is a pattern diagram illustrating the configuration of the 2×2 optical switch 1 according to this embodiment. As for the common parts to the first embodiment, explanation is omitted or simplified.

The 2×2 optical switch 1 illustrated in FIG. 7 is partially included in an arbitrary pillar type tetragonal lattice photonic crystal. The 2×2 optical switch 1 includes two directional couplers 20 and 23 and waveguides 90 and 91 therebetween. Then, the Mach-Zehnder interferometer is composed. To be specific, as with the first embodiment, the first directional coupler 20 is disposed on the input side of the 2×2 optical switch 1, and the second directional coupler 23 is disposed on the output side of the 2×2 optical switch 1. Further, the first directional coupler 20 and the second directional coupler 23 are connected by the first path waveguide 90 and the second path waveguide 91.

The cross-section area of the defect pillar which composes the line defect of the waveguide of at least one path of the two above-mentioned paths is smaller than the cross-section area of the defect pillar composing the line defect of the waveguide which composes the directional couplers 20 and 23. The cross-section areas of line defect pillars 101, 103, and 111 of the first path waveguide 90 are smaller than the cross-section areas of the line defect pillars 21 and 24 of the waveguide which compose the directional couplers 20 and 23 in FIG. 7. Similarly, the cross-section areas of the line defect pillars 105, 107, and 113 of the second path waveguide 91 are smaller than the cross-section areas of the line defect pillars 22 and 25 of the waveguides which compose the directional couplers 20 and 23. Note that for simplicity, the part in which the line defect of the waveguide, that is, the part where line defect pillars are disposed, may be simply referred to as a waveguide. Moreover, the line defect of the waveguide indicated by the symbol 100 or the like in FIGS. 7 and 8 may be simply referred to as a waveguide in the document.

The waveguide of a path with a small cross-section area of the defect pillar includes two taper waveguides in which one each of them is disposed on the both ends. The waveguide of the path with a small cross-section area is disposed between the two taper waveguides, and has a connection waveguide connected to the directional couplers 20 and 23 via the taper waveguides. To be specific, the first path waveguide 90 includes two taper waveguides 100 and 102, and a connection waveguide 110 disposed between the two taper waveguides 100 and 102. Further, the second path waveguide 91 includes two taper waveguides 104 and 106, and a connection waveguide 112 disposed between the two taper waveguides 104 and 106.

In the first path waveguide 90, the cross-section areas of the line defect pillars 101 and 103 of the photonic crystal waveguide which compose the taper waveguides 100 and 102 gradually increase as moving away from the connection waveguide 110. Similarly, in the second path waveguide 91, the cross-section areas of the line defect pillars 105 and 107 of the photonic crystal waveguide which compose the taper waveguides 104 and 106 gradually increase as moving away from the connection waveguide 112. The cross-section area of the line defect pillar of the taper waveguide is smaller than the cross-section area of the line defect pillar of the directional coupler connected to one end, and larger than the cross-section area of the line defect pillar of the connection waveguide connected to the other end.

In this way, the cross-section areas of the line defect pillars 101, 103, 105, and 107 are smoothly changed by the taper waveguides 100, 102, 104, and 106. Then, as the light transmitted through the waveguide will not be influenced by a sudden change in the shape of the waveguide, no unnecessary reflection is generated. The 2×2 optical switch 1 according to this embodiment is composed as mentioned above.

As mentioned above, the cross-section areas of the line defect pillars 111 and 113 of the connection waveguides 110 and 112 are smaller than the cross-section areas of the line defect pillars 21, 22, 24, and 25 of the directional couplers 20 and 23. For this reason, the connection waveguides 110 and 112 can guide the light of a frequency higher than the maximum of the transmission band of the directional couplers 20 and 23. The frequency of the maximum of the transmission band of directional couplers 20 and 23 shall be f1, and the frequency of the maximum of the transmission band of the connection waveguides 110 and 112 shall be f2. In this case, by appropriately adjusting the length of the connection waveguides 110 and 112, the light which has the frequency between f1 and f2, for example, the frequency of f3, causes resonance in the part of the connection waveguides 110 and 112.

The connection waveguides 110 and 112 function as a resonator in this way. Therefore, the 2×2 optical switch 1 according this embodiment can also be said in the following way. A part or all of the waveguides of at least one path of the waveguides 90 and 91 of the two paths between the directional couplers 20 and 23 operate as a resonator. Further, this resonator resonates to the light of the frequency other than the waveguide band of the waveguide which composes the directional couplers 20 and 23.

To be specific, the light which causes this resonance has a frequency higher than the maximum of the transmission band of the directional couplers 20 and 23. Accordingly, the light which causes this resonance cannot be transmitted through the waveguides composing the directional couplers 20 and 23, and does not leak to the directional couplers 20 and 23. Further, this realizes the operation of the stable 2×2 optical switch 1.

As a result of strong light existing in the resonator, third nonlinear effect increases in the connection waveguides 110 and 112. This changes the refractive index of the connection waveguides 110 and 112 to a non-negligible extent. Alternatively, if the connection waveguides 110 and 112 absorb even slight light, a part of the energy of the light of high intensity which is accumulated in the connection waveguides 110 and 112 is absorbed and converted into heat. Furthermore, by heating the connection waveguides 110 and 112, the refractive index changes due to thermooptical effects. As mentioned above, the refractive index of the connection waveguides 110 and 112 can be modulated.

By coupling the control light and the guided light, the refractive index of the connection waveguides 110 and 112 is selectively changed. Then, the transmission characteristic of the connection waveguides 110 and 112 can be shifted to the short wavelength or long wavelength side. The light of less than or equal to the frequency f1 can be transmitted through the directional coupler 23, and can be switched by the 2×2 optical switch 1. In summary, according to this embodiment, it is possible to efficiently operate the optical switch that can be controlled by light.

As for the optical switch of this embodiment, the group velocity of the guided light of the connection waveguides 110 and 112 increases compared to the guided light of the directional couplers 20 and 23. For this reason, the effect in the first embodiment which can reduce the waveguide stub cannot be used. However, the refractive index of the connection waveguides 110 and 111 can be efficiently changed by the control light of the frequency f3. Then, the optical switch according to this embodiment can be operated as an optical switch capable of light control.

Figure 8:
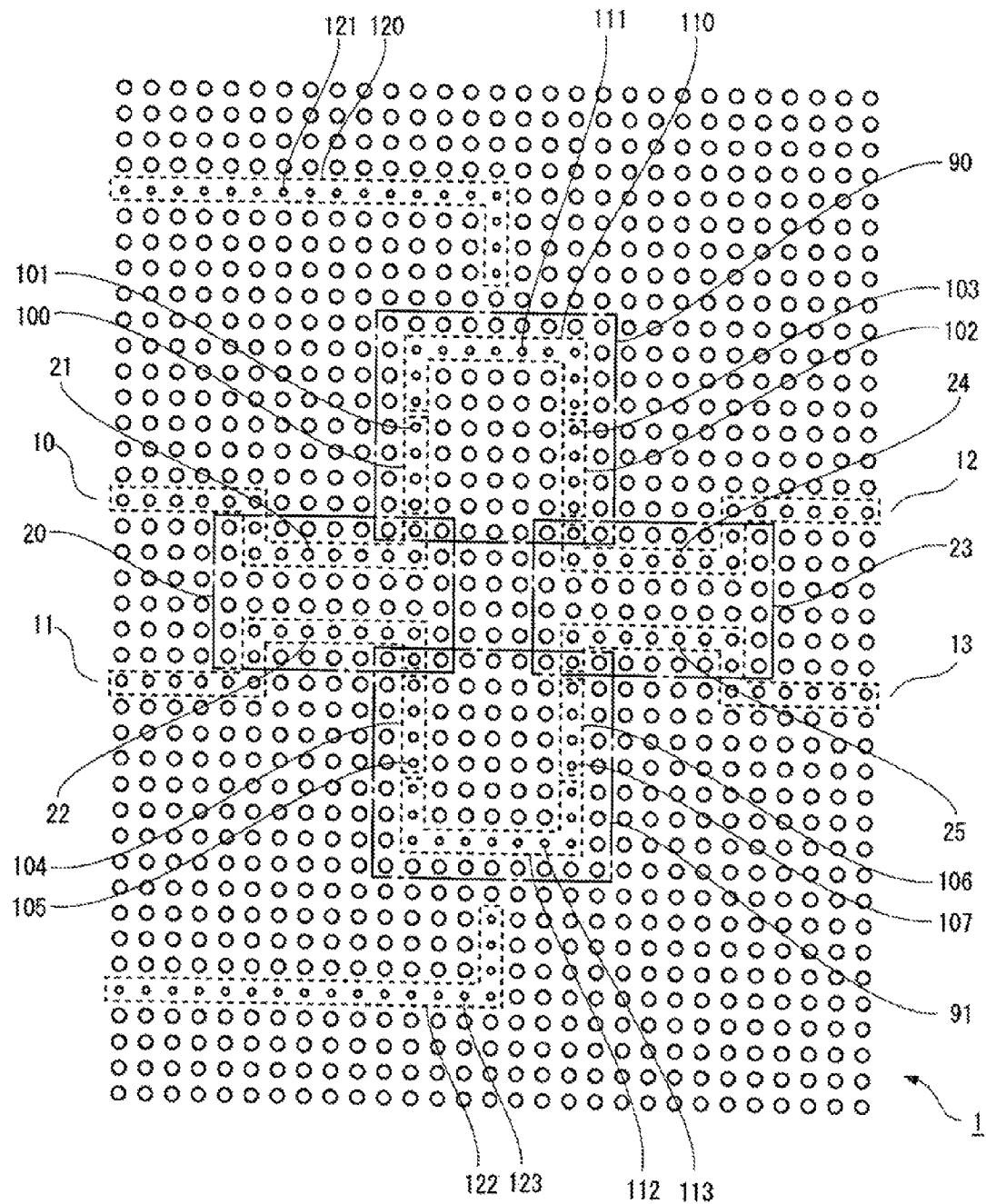
FIG. 8 is a schematic cross-sectional diagram illustrating the configuration of the 2×2 optical switch including a control light input unit according to the second embodiment.
Figure 9:
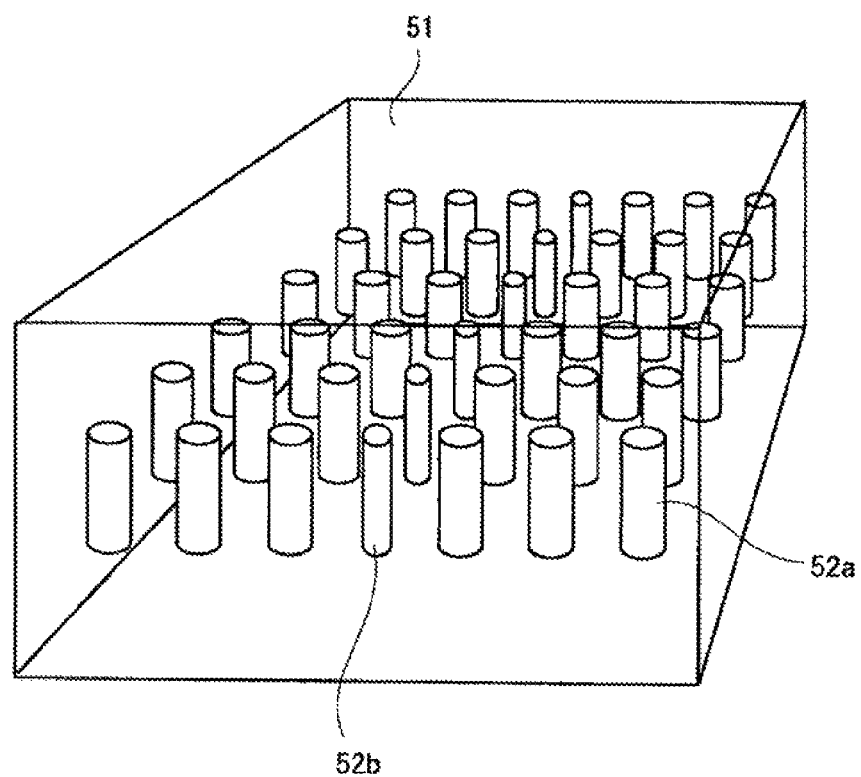
FIG. 9 is a single view drawing of a tetragonal lattice pillar type photonic crystal including line defects.
Figure 10:
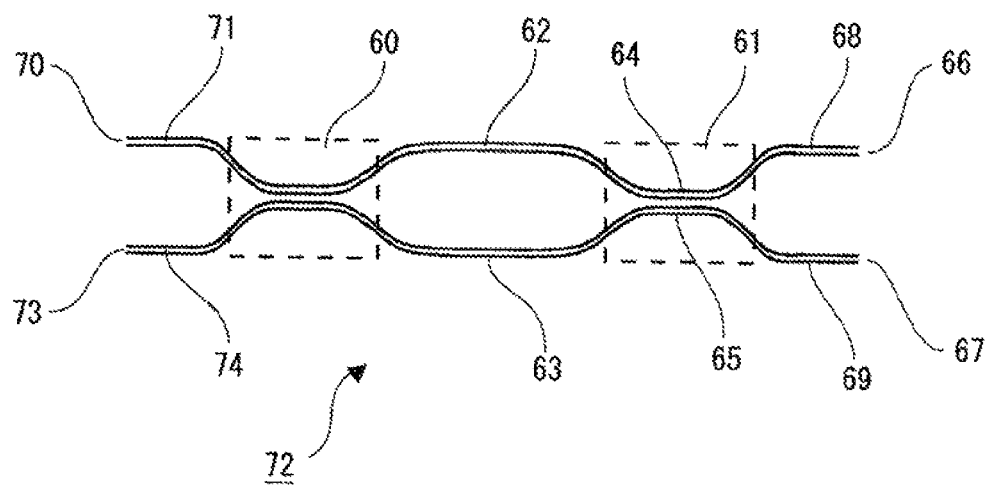
FIG. 10 is a pattern diagram of a 2×2 optical switch by a waveguide.

Next, the 2×2 optical switch 1 including an input unit of the control light is explained with reference to FIG. 8. FIG. 8 is a pattern diagram illustrating the configuration of the 2×2 optical switch 1 including the input unit of the control light according to this embodiment. The configuration other than the input unit of the control light is the same as the configuration of the 2×2 optical switch 1 illustrated in FIG. 7.

A proximate waveguide 120 is disposed proximate to the connection waveguide 110. Similarly, a proximate waveguide 122 is disposed proximate to the connection waveguide 112. Line defect pillars 121 and 123 of the proximate waveguides 120 and 122 have cross-section areas less than or equal to the cross-section areas of the line defect pillars 111 and 113 of the proximate connection waveguide 110 or the connection waveguide 112. The connection waveguide 110 is optically coupled to the proximate waveguide 120, and the connection waveguide 112 is optically coupled to the proximate waveguide 122. The proximate waveguides 120 and 122 are L-shaped, in which they are bent at about 90 degrees to the nearby connection waveguide 110 or the connection waveguide 112 side, for example. Then, it is possible to effectively make the connection waveguides 120 and 122 be proximate to the connection waveguide 110 or the connection waveguide 112. The proximate waveguides 120 and 122 are to be the input units of the control light and function as waveguides for control.

In other words, the waveguide for control is disposed proximate to the resonator. The waveguide for control can guide light of a frequency in the band gap of a photonic crystal. Further, the waveguide for control can guide the light of a resonance frequency of each resonator of the two connection waveguides 110 and 112. Each resonator and the waveguide for control are optically coupled.

By appropriately separating the waveguides for control, which is the proximate waveguides 120 and 122, from the connection waveguides 110 and 112, it is possible to sufficiently increase a Q value. The Q value here is a value used as an indication of the strength of the resonator to confine light. That is, intensity of the light accumulated in the connection waveguides 110 and 112 can be Q times of the light of the frequency f3 which is guided through the proximate waveguides 120 and 122. Since the Q value can be from thousands to ten thousands or more, if the light of low intensity and the frequency f3 enters, light energy with high intensity is accumulated in the connection waveguides 110 and 112. Then the refractive index can be efficiently changed as described above. Thus, it is possible to operate as an optical switch capable of optical control.

The guided light of the directional coupler 20 or the directional coupler 23 penetrates into the connection waveguides 110 and 111. However, as the taper waveguides 100, 102, 104, and 106 exist therebetween, the reflection resulting from a sudden change in the waveguide configuration will not be generated. Therefore, the light less than or equal to the frequency f1 does not produce resonance in the process to transmit the 2×2 optical switch 1. Accordingly, the intensity of the light less than or equal to the frequency f1 in the connection waveguides 110 and 111 is at the same level as the intensity when transmitting through the directional couplers 20 and 23. Thus, the intensity of the leaking light less than or equal to the frequency f1 from the connection waveguide 110 to the proximate waveguide 120 and from the connection waveguide 111 to the proximate waveguide 122 remain at about 1/Q of the intensity of the light transmitting through the connection waveguide 110 or the connection waveguide 112, which is ignorable level.

Note that in the taper waveguides 100, 102, 104, and 106, the cross-section areas of the dielectric pillars which compose the defect of the line defects may increase stepwise in the direction away from the connection waveguides 110 and 112. Specifically, in the taper waveguides 100, 102, 104, and 106, the cross-section areas of the line defect pillars 101, 103, 105, and 107 may increase stepwise in the direction away from the connection waveguides 110 and 112. Further, the part gradually decrease and the part increases stepwise may be included.

The waveguides 90 and 91 of the two paths between the two directional couplers 20 and 23 may have the same or different length. In other words, the waveguides 90 and 91 of the two paths may have the same length to be a symmetrical Mach-Zehnder interferometer, or the waveguides 90 and 91 of the two paths may have different lengths to be an asymmetrical Mach-Zehnder interferometer.

When the 2×2 optical switch 1 is a symmetrical Mach-Zehnder interferometer, for example as illustrated in FIG. 8, the proximate waveguides 120 and 122 are disposed proximate to the both connection waveguides 110 and 112. In this case, if control light is input only to either of the two proximate waveguides 120 and 122, the output port of the light is switched. Then, if there is no control light for both or the control light is input to both, it is possible to let the 2×2 optical switch 1 perform the operation of a logic circuit such that the exit port of light is not switched.

Further, in the case that the 2×2 optical switch 1 is an asymmetrical Mach-Zehnder interferometer, in a similar manner as the above case, the proximate waveguides 120 and 122 are disposed proximate to the both connection waveguides 110 and 112. Then, it is possible to let the 2×2 optical switch 1 perform the operation of a logic circuit which is different from the symmetrical case. Moreover, the combination thereof may be possible.

In the case of FIGS. 7 and 8, a photonic crystal is a tetragonal lattice pillar type photonic crystal, but it may be a triangular lattice hole type photonic crystal. It is needless to say that this applies to the first embodiment. Furthermore, two or more of such 2×2 optical switches 1 may be arranged, and the proximate waveguides (waveguides for control) 120 and 122 included in each of the individual 2×2 optical switches may be the same or connected to each other.

Examples of the embodiments of the optical switch according to the present invention have been described so far, however the present invention is not limited to the above embodiments. For example, pillars other than the line defect pillar which compose the optical switch can be displaced, or the cross-section area thereof can also be increased or decreased. Moreover, the pillar is not necessarily a cylinder, but may be other shapes such as square pole or octagon pillar. Additionally, although the periodic structure of the photonic crystal is tetragonal lattice from the point that the propagation speed of light in the line defect waveguide is slow in a wide band, it is not limited to this. The periodic structure of the photonic crystal may be other periodic structures such as a hexagonal lattice.

Note that in this embodiment, the 2×2 optical switch is explained as an example of the optical switch, however it is not limited to this. By combining the optical switches of this embodiment, it is possible to apply the optical switch to a m×n optical switch (m and n are integers of two or more) such as a 2×4 optical switch and a 2×8 optical switch.

Furthermore, the present invention is not limited to the above embodiments, but various modifications can be made in the range without departing from the scope of the above-mentioned present invention.

INDUSTRIAL APPLICABILITY

The present invention is applied to an optical switch and a manufacturing method thereof, and particularly applied to an optical switch using a waveguide, and a manufacturing method thereof.

The invention claimed is:

1. An optical switch of a Mach-Zehnder interferometer type composed of a line defect waveguide of a photonic crystal, the optical switch comprising two directional couplers and two paths of waveguides therebetween,
   wherein the directional couplers have at least two input ends and two output ends,
   a part equivalent to a core of the line defect waveguide is composed by arranging defect pillars in a line,
   a part equivalent to a clad of the line defect waveguide is a lattice of non-defect pillars on both sides of the defect pillars,
   and between the two paths, a first path of the waveguide and a second path of the waveguide have different group velocity of guided light.

2. The optical switch according to claim 1, wherein between the first path of the waveguide and the second path of the waveguide, a cross-section area of the defect pillar in the second path of the waveguide is larger.

3. The optical switch according to claim 2, wherein a waveguide length of the second path is longer than a waveguide length of the first path.

4. The optical switch according to claim 1, wherein the second path of the waveguide comprises:
   two taper waveguides, each of the taper waveguides being disposed at both ends; and
   a connection waveguide that is disposed between the two taper waveguides and connected to the two directional couplers via the taper waveguides.

5. The optical switch according to claim 4, wherein a cross-section area of the defect pillar of a photonic crystal waveguide forming the two taper waveguides gradually decreases as moving away from the connection waveguide.

6. An optical switch of a Mach-Zehnder interferometer type composed of a line defect waveguide of a pillar type photonic crystal, the optical switch comprising two directional couplers and two paths of waveguides therebetween,
   wherein the directional couplers have at least two input ends and two output ends,
   a part equivalent to a core of the line defect waveguide is composed by arranging defect pillars in a line,
   a part equivalent to a clad of the line defect waveguide is a lattice of non-defect pillars on both sides of the defect pillars,
   and between the two paths, a cross-section area of the defect pillar of at least one path of the waveguide is smaller than a cross-section area of a defect pillar forming a line defect of the waveguide composing the directional coupler.

7. The optical switch according to claim 6, wherein between the two paths of the waveguides, a waveguide length of one of the path is longer than a waveguide length of the other path.

8. The optical switch according to claim 6, wherein the path of the waveguide with the small cross-section area of the defect pillar comprises:
   two taper waveguides, each of the taper waveguides being disposed at both ends; and
   a connection waveguide that is disposed between the two taper waveguides and connected to the two directional couplers via the taper waveguides.

9. The optical switch according to claim 8, wherein the cross-section area of the defect pillar of a photonic crystal waveguide forming the two taper waveguides gradually increases as moving away from the connection waveguide.

10. The optical switch according to claim 8 further comprising a proximate waveguide that is proximate to the connection waveguide, the proximate waveguide including the defect pillar that has the cross-section area less than or equal to the cross-section area of the defect pillar forming the line defect of the connection waveguide,
    wherein the connection waveguide and the proximate waveguide are optically coupled.

11. An optical switch comprising at least two of the optical switch according to claim 10,
    wherein each of the proximate waveguide included in the individual optical switch is same or connected to each other.

12. An optical switch of a Mach-Zehnder interferometer type composed of a line defect waveguide of a photonic crystal, the optical switch comprising two directional couplers and two paths of waveguides therebetween, wherein the directional couplers have at least two input ends and two output ends, a part equivalent to a core of the line defect waveguide is composed by arranging defect pillars in a line, a part equivalent to a clad of the line defect waveguide is a lattice of non-defect pillars on both sides of the defect pillars, and a part or all of at least one of the two paths of the waveguides operates as a resonator that resonates to light of a frequency other than a waveguide band of the waveguide composing the directional coupler.

13. The optical switch according to claim 12, further comprising a waveguide for control that is proximate to the resonator, the waveguide for control being capable of guiding light of a frequency in a band gap of the photonic crystal, and also capable of guiding light of a resonance frequency of the resonator, wherein the resonator and the waveguide for control are optically coupled.

14. An optical switch comprising two or more of the optical switch according to claim 13, wherein each of the waveguide for control included in the individual optical switch is same or connected to each other.

15. The optical switch according to claim 1, wherein the photonic crystal has a tetragonal lattice.

16. A manufacturing method of an optical switch of a Mach-Zehnder interferometer type composed of a line defect waveguide of a photonic crystal, the manufacturing method comprising forming two directional couplers and two paths of waveguides therebetween, wherein the directional couplers have at least two input ends and two output ends, a part equivalent to a core of the line defect waveguide is composed by arranging defect pillars in a line, a part equivalent to a clad of the line defect waveguide is a lattice of non-defect pillars on both sides of the defect pillars, and between the two paths, a first path of the waveguide and a second path of the waveguide have different group velocity of guided light.

17. The optical switch according to claim 6, wherein the photonic crystal has a tetragonal lattice.

18. The optical switch according to claim 12, wherein the photonic crystal has a tetragonal lattice.

19. An optical switch of a Mach-Zehnder interferometer (MZI) type comprising:

a waveguide core of a first MZI path comprising a plurality of first photonic crystal pillars arranged to form (i) a first photonic band that is transmissive for light of an operating frequency, and (ii) a first group velocity dispersion for light of the operating frequency;

a waveguide core of a second MZI path comprising a plurality of second photonic crystal pillars arranged to form (i) a second photonic band that is transmissive for light of the operating frequency, and (ii) a second, different, group velocity dispersion for light of the operating frequency; and a clad region comprising a plurality of third photonic crystal pillars arranged on both sides of the waveguide core of the first MZI path and the waveguide core of the second MZI path to form a photonic band gap that is not transmissive for light of the operating frequency.

20. The optical switch of claim 19, wherein a photonic crystal pillar of the first photonic crystal pillars has a different pillar cross-section area from a photonic crystal pillar of the second photonic crystal pillars.

21. The optical switch of claim 19, further comprising:

a first directional coupler comprising a first output end coupled to the first MZI path and a second output end coupled to the second MZI path; and a second directional coupler comprising a first input end coupled to the first MZI path and a second input end coupled to the second MZI path.

22. The optical switch of claim 19 further comprising:

a waveguide core of a first connection waveguide coupled to an input of the first MZI path, the waveguide core of the first connection waveguide comprises a plurality of fourth photonic crystal pillars arranged to form (i) a third photonic band that is transmissive for light of the operating frequency and (ii) a second photonic band gap that is reflective for light of the control frequency; and a waveguide core of a second connection waveguide coupled to an output of the first MZI path, the waveguide core of the second connection waveguide comprises a plurality of fourth photonic crystal pillars arranged to form (i) a fourth photonic band that is transmissive for light of the operating frequency and (ii) a third photonic band gap that is reflective for light of the control frequency.

23. An optical switch of a Mach-Zehnder interferometer type comprising:

a waveguide core of a first MZI path comprising a plurality of first photonic crystal pillars arranged to form a first photonic band that is transmissive for light of (i) an operating frequency and (ii) a control frequency;

a waveguide core of a second MZI path comprising a plurality of second photonic crystal pillars arranged to form a second photonic band that is transmissive for light of the operating frequency;

a waveguide core of a first connection waveguide coupled to an input of the first MZI path, the waveguide core of the first connection waveguide comprises a plurality of third photonic crystal pillars arranged to form (i) a third photonic band that is transmissive for light of the operating frequency and (ii) a first photonic band gap that is reflective for light of the control frequency;

a waveguide core of a second connection waveguide coupled to an output of the first MZI path, the waveguide core of the second connection waveguide comprises a plurality of fourth photonic crystal pillars arranged to form (i) a fourth photonic band that is transmissive for light of the operating frequency and (ii) a second photonic band gap that is reflective for light of the control frequency; and a clad region comprising a plurality of fifth photonic crystal pillars arranged on both sides of the waveguide core of the first MZI path and the waveguide core of the second MZI path to form a third photonic band gap that is not transmissive for light of the operating frequency, wherein the first connection waveguide, the first MZI path, and the second connection waveguide form a resonator for light of the control frequency.

24. The optical switch of claim 23, wherein a photonic crystal pillar of the first photonic crystal pillars has a same pillar cross-section area from a photonic crystal pillar of the second photonic crystal pillars.

25. The optical switch of claim 23, further comprising:

a first directional coupler comprising a first output end coupled to the first MZI path and a second output end coupled to the second MZI path; and a second directional coupler comprising a first input end coupled to the first MZI path and a second input end coupled to the second MZI path.

26. The optical switch of claim 23, further comprising:
a waveguide core of a proximate waveguide comprising a plurality of sixth photonic crystal pillars arranged to form (i) a fifth photonic band that is transmissive for light of the control frequency,
wherein the proximate waveguide is configured to (i) receive light of the control frequency and to (ii) optically couple the received light to the first MZI path.

* * * * *